Patented Aug. 18, 1942

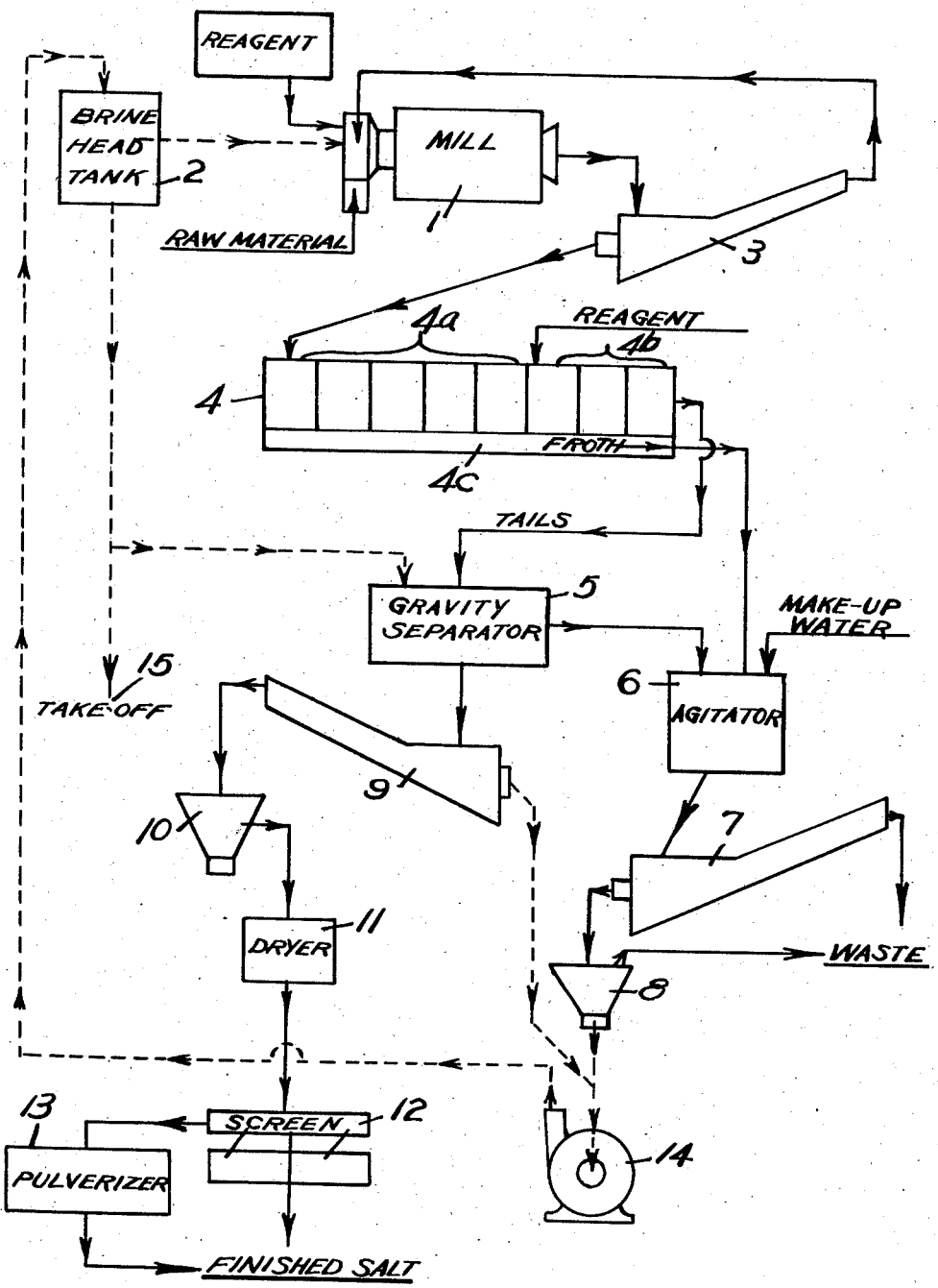

2,293,111

UNITED STATES PATENT OFFICE 2,293,111

SALT TREATING PROCESS

Thomas P. Campbell, Denver, and William B. Jacobsen, Creede, Colo.

Application August 1, 1939, Serial No. 287,726

7 Claims. (Cl. 209—2)

This invention relates to a method of purification of salt and more particularly relates to improvements in the separation of contaminating materials, such as insoluble gangues and the like from salt compositions, such as native rock salt, crude solar-evaporated salt or by-product salt of various types.

In our co-pending application, Serial No. 47,852, filed November 1, 1935, for Process of treating soluble materials, we have disclosed certain methods of purifying salt compositions, such as native salt, and the present application constitutes a continuation-in-part of the aforesaid application. While the aforesaid application discloses certain operating procedure in the flow sheet and accompanying description, the claims deal with the flotation separation per se and such features are not claimed herein. In the present case, there are disclosed certain improvements in the flotation separation per se, as well as an improved operating procedure for the entire treatment circuit and these features comprise the subjects matter of the claims of this application.

While the present process is adapted for many different types of treatments and may be regulated to produce a final product of a variable degree of purity, it is particularly adapted for the purification of native rock salt or crude salt of solar-evaporation to raise the purity thereof within the limits prescribed for use in the meat packing industry, for example.

As the material under treatment will comprise a relatively large proportion of salt and a relatively small proportion of impurity, it is of primary importance that the separation be attained by methods requiring a minimum amount of handling of the bulk of material under treatment and at relatively low treatment cost, as the final product of the treatment, of necessity, must be a relatively cheap product.

It is an object of the present invention to provide a simple, efficient and cheap method of removing the impurities, particularly insolubles, from impure salt compositions to bring such composition within the purity range required for commercial purposes.

A further object of the invention is the provision of ore dressing methods for the separation of impurities from contaminated salt compositions, which will permit a selective control of the degree of separation of the constituent materials.

A still further object of the invention is the provision of a treatment in which purified salt is produced at one stage of the operation and a purified salt brine suitable for commercial purposes is produced at another stage of the same operation.

Still another object of the invention is to provide a treatment which is adapted for use alone or in conjunction with an evaporator system or rebrining system.

Other objects reside in novel operating methods and novel steps and treatments, all of which will appear more fully in the course of the following description.

In the froth flotation separation, a close control should be exercised and to this end the treatment employs a frother, an inhibiting or depressing agent which also functions to deflocculate the salt constituents, a froth modifier which produces a compact, stiff and durable froth, and a collector for the earthy impurities, which also exerts a flocculating action thereon.

By the use of such reagents, it is possible to so regulate and control the flotation reaction that the desired degree of separation is attained at all times and by varying the proportion of the reagents, a differential degree of separation may be attained in accordance with the treatment requirements.

This this end, an aqueous solution is prepared containing by weight approximately 1% of each of the frother, depressant and modifying agents. The frother preferably is a pure soda soap, although if desired, C. P. sodium oleate may be used, although it is a more costly reagent. The depressant used in the treatment is a sodium silicate composition, preferably crystallized waterglass, while the modifier is a polysaccharide, such as gum arabic, gum tragacanth or gum copal.

The constituents of the reagent composition need not be made up into a single solution, but may be prepared and added separately. However, it is usually more convenient to make up a single solution containing each of the ingredients.

While the amount of reagent so employed may be varied within certain limits, the amount of each reagent composition required in the treatment should be within the range of from a trace to 0.5 pound per ton of crude salt treated. The collector reagent may be selected from various fatty acids, such as palmitic, capric, stearic, and oleic acid. In practice, we have found that in addition to being cheapest, oleic acid is the most effective in the collecting function. While for certain treatments "technical" or crude oleic acid may be used with satisfactory results, this material contains coloring matter which leaves a gummy stain on the final product of the treatment. Therefore, whenever a high degree of purity and good color are requisites of the separation, a water-white grade of oleic acid such as the C. P. or U. S. P. should be used.

The total amount of collector reagent used in the treatment will be subject to considerable variation, but the effective range is from a trace to 0.5 pound per ton of crude salt treated, depending upon the nature and impurity content of the salt.

To afford a better understanding of the manner of practicing the invention, reference is made to the accompanying flow sheet illustrating a treatment circuit well suited for attaining the objects of the present invention.

This treatment utilizes a continuous-flow system. The raw material to be treated, native rock salt, for example, is fed to a tumble mill, such as a ball mill 1 and is there mixed with the saturated brine from the head tank 2 by the tumbling action of the mill. Likewise, reagent is introduced for mixing in the mill which usually comprises about one-half of the oleic acid and most or all of the first reagent solution. In the mill, the ore is reduced to a suitable degree of fineness to unlock the mineral constituents of the raw material. While a considerable range in the sizing of the material can be utilized without material impairment of recovery, we have found that best results are attained when the degree of grinding is within the limits of 100% through minus 35 mesh to 100% through minus 150 mesh.

Grinding may be performed in either open or closed circuit, but preferably is practiced in closed circuit as here illustrated. The discharge from the ball mill is conducted to a classifier 3 with the overflow thereof passing directly to a battery of flotation cells 4 in series, while the oversize of classification is returned in any suitable manner to the mill for regrinding therein.

The treatment of the pulp in the grinding and classification treatments serves to thoroughly intermix solids of the pulp with the reagent solution and provides a sufficient reaction interval so that upon reaching the flotation treatment, the gangues and other earthy impurities are in proper condition to respond to the flotation reaction.

Preferably, the flotation circuit comprises two groups of cells and they have been indicated in the flow sheet as a preliminary group of five cells designated 4a and a secondary series of three cells designated 4b. In the first five cells no additional reagent is added and the pulp passes progressively through the cells, in each of which it is subjected to the usual agitation and aeration treatments. The gangues rise to the surface and collect in the froth while the sodium chloride constituents remain in a depressed condition due to the lack of affinity of reagent therefor and aided in part at least by the action of the depressant which deflocculates and depresses the salt. The pulp passing from the fifth cell of series 4a into the sixth cell or first cell of series 4b is subjected to the action of the additional reagent comprising the remainder of the specified oleic acid plus any remaining quantity of the reagent solution not introduced into the grinding circuit.

The action of the reagent in the cells 4b serves to complete the separation with the minor inclusions of gangues remaining in the pulp being carried to the surface in the froth, while the depressed sodium chloride remains in a non-floated condition and passes through these cells as a residue.

In most operations, certain impurities are bound to escape the grinding circuit before sufficiently comminuted and to some degree at least, particles of iron or steel are present in the pulp as a result of the mining, crushing and grinding operations and such coarse metallic substances are apt to escape removal in the flotation froth.

As the densities of these constituents are greater then that of the salt, they may be removed from the fine salt product by gravity methods following the flotation treatment.

To this end, the tailings discharge of the flotation separation is conducted to a gravity separator 5, preferably a "Wilfley" table, although washing classifiers may be utilized in place thereof. Due to the greater density of the coarse impurities and the metallic substances aforementioned, the gravity separation serves to eliminate the undesired products from the residue of the flotation separation. To insure efficiency of the gravity separation, brine from the head tank 2 is introduced into the gravity separator 5 to maintain the proper pulp ratio for such separation.

The froth concentrate of the flotation separation in both the cells 4a and 4b is collected in a suitable receptacle, such as a launder 4c and passes therefrom to an agitator 6. The reject material of the gravity separator 5 likewise passes to the agitator 6 and is there subjected to a leaching treatment. As it is often impossible to remove all of the impurities in the flotation separation without floating up some very fine salt particles which are entrapped in the froth, the provision of the leaching circuit simplifies the control of separation that must be exercised in the flotation cells.

Make-up water is introduced into the agitator 6 and serves to leach the froth concentrate product and gravity reject product so introduced.

Thereafter, the brine formed in the agitator 6 is conducted to a classifier 7. The leaching action of the agitator 6 serves to eliminate from the solid contents of the pulp whatever coarser sizes of the salt have been fed thereto and as a consequence, the oversize product of the classification operation comprises only the impurities of the original feed and any metallic substances which have carried into the pulp. The oversize discharge of the classifier 7 therefore is passed to waste.

The overflow of the classifier 7 is passed directly to a filter 8 in which the finer sizes of the impurities are removed from the leaching liquor and also pass to waste.

Following the treatment in the gravity separator 5, the sodium chloride concentrate is subjected to a further classification treatment at 9 and the oversize of the classification is conducted to a filter 10 after which the solids so separated are conducted through a drier 11 for the removal of moisture and onto a shaking screen 12 for the removal of coarse or lumpy material in the product following the drying treatment. Thereafter, the solids reject of the screening operation is conducted into a pulverizer 13 to reduce it to a fine, free-flowing condition and the discharge of the pulverizer plus the screen undersize is a finished product of commercial grade salt.

The overflow of the classifier 9, which is a product essentially free from solids, is conducted by the action of a pump 14, together with the filtrate from filter 8 to the brine head tank 2 for subsequent reuse in the circuit. Due to the fact that the leaching action involves the continuous introduction of substantial quantities of water into the circuit, which in the subsequent treatments serve to produce saturated solution, there is produced in the circuit greater quantities of such solution than is needed for the maintenance of the operation where the solution is recirculated through the several treatments.

This saturated solution or brine is of a quality suitable for commercial purposes and is removed at 15 designated "takeoff" for commercial usage either in an associated evaporator system or rebrining system, the details of which form no part of the present invention.

From the foregoing, it will be apparent that the flotation separation and subsequent treatments result in production of sodium chloride of a high degree of purity, as well as a considerable source of saturated brine of commercial grade. The provision of the leaching circuit in conjunction with the flotation separation, serves to simplify the flotation operation, since sodium chloride content carried into the froth is not lost in the rejection of the waste product of the separation, but is carried back through the circuit in the form of solution and thus becomes a marketable product.

In the flotation operation, the selection of reagent compositions and the proportion of ingredients permit a choice and control of the selectivity of the separation. Any of the several combinations of ingredients used within the ranges specified hereinbefore will give workable results, and in any given operation where the factors of efficiency and cost are both to be considered, testing in the usual manner will readily disclose the best combinations and proportions for the treatment of a given composition.

Throughout the specification, the expression "earthy materials" has been used to designate the impurity of the sodium chloride composition, and it will be understood that such term embraces a wide variety of compositions, usually insoluble or at least difficultly soluble in the brine of the treatment, such as clays, gypsum and the like.

Likewise, the expressions "salt" and "sodium chloride" are used interchangeably throughout the specification and are intended to embrace the entire class of compositions of both natural and artificial production, which in chemical composition is essentially sodium chloride.

The operating methods herein described and illustrated, represent operating practice which has been found to give highly satisfactory results, and while it will be apparent to those skilled in the art that changes in the equipment used and in the order and sequence of treatment steps may be resorted to, the essential features of the present arrangement and operation will be utilized to attain the objects of the present invention.

The specification of reagent compositions is not intended as a limitation of the compositions necessary in attaining the desired treatments and reactions, and equivalent compositions possessing similar properties which function in the operation in the same way are intended to be used within the spirit and scope of the invention.

What we claim and desire to secure by Letters Patent is:

1. The process of treating salt compositions containing earthy constituents as impurities, which comprises introducing such a composition in finely-divided condition into a saturated saline solution to form a pulp, separating the salt and earthy constituents by froth flotation, subjecting the salt so separated to a gravity separation treatment for the separation of compositions of greater specific gravity from the salt, mixing the reject of the gravity separation with the earthy constituents separated at the flotation stage, subjecting the resulting mixture to a leaching treatment to recover salt intermixed therewith in solution, separating the solids and liquids of the leaching operation, and returning the liquid so separated to the flotation stage as the saturated brine of the pulp.

2. The process of treating salt compositions containing earthy constituents as impurities, which comprises introducing such a composition in finely-divided condition into a saturated saline solution to form a pulp, separating the salt and earthy constituents by froth flotation, subjecting the salt so separated to a gravity separation treatment, mixing the reject of the gravity separation with the earthy constituents separated at the flotation stage, subjecting the resulting mixture to a leaching treatment, separating the solids and liquids of the leaching operation, returning the liquid so separated to the flotation stage as the saturated brine of the pulp, and removing excess saturated brine from the circuit as a final product of the treatment.

3. The process of treating salt compositions containing earthy constituents as impurities, which comprises introducing such a composition in finely-divided condition into a saturated saline solution to form a pulp, separating the salt and earthy constituents by froth flotation, mixing the salt so separated with brine of the treatment, subjecting such mixture to a gravity separation treatment for the separation of compositions of greater specific gravity from the salt, mixing the reject of the gravity separation with the earthy constituents separated at the flotation stage, subjecting the resulting mixture to a leach-treatment to recover salt intermixed therewith in solution, separating the solids and liquids of the leaching operation, and returning the liquids so separated to the flotation stage as the saturated brine of the pulp.

4. The process of treating salt compositions containing earthy constituents as impurities, which comprises introducing such a composition in finely-divided condition into a saturated saline solution to form a pulp, separating the salt and earthy constituents by froth flotation, subjecting the salt so separated to a gravity separation treatment for the separation of compositions of greater specific gravity from the salt, dewatering the concentrate of the gravity separation, discharging the dewatered salt concentrate as a final product of the treatment, mixing the reject of the gravity separation with the earthy constituents separated at the flotation stage, subjecting the resulting mixture to a leaching treatment to recover salt intermixed therewith in solution, separating the solids and liquids of the leaching operation, returning the liquids so separated to the flotation stage as the saturated brine of the pulp, and removing excess saturated brine from the circuit as a final product of the treatment.

5. The process of treating salt compositions containing earthy constituents as impurities, which comprises introducing such a composition in finely-divided condition into a saturated saline solution to form a pulp, separating the salt and earthy constituents by froth flotation, subjecting the salt so separated to a gravity separation treatment for the separation of compositions of greater specific gravity from the salt, subjecting such cleaned salt of the gravity separation operation to a classification treatment, and dewatering the sands of the classification treatment constituting commercial sizes to produce a purified salt as a final product of the treatment.

6. The process of treating salt compositions containing earthy constituents as impurities, which comprises introducing such a composition in finely-divided condition into a saturated saline solution to form a pulp, separating the salt and earthy constituents by froth flotation, subjecting the salt so separated to a gravity separation treatment for the separation of compositions of greater specific gravity from the salt, subjecting such cleaned salt of the gravity separation operation to a classification treatment, dewatering the sands of the classification treatment constituting commercial sizes to produce a purified salt as a final product of the treatment, and returning the overflow of the classification treatment to the flotation circuit as the saturated brine of the pulp.

7. The process of treating salt compositions containing earthy constituents as impurities, which comprises introducing such a composition in finely-divided condition into a saturated saline solution to form a pulp, separating the salt and earthy constituents by froth flotation in which the earthy constituents are floated, separating the salt content of the residue of the flotation separation, treating the salt so separated to remove fines and liquid therefrom, mixing the residue after removal of the salt and the fines of such separations with the earthy constituents separated at the flotation stage, subjecting such intermixture in the presence of added water to a leaching operation to recover salt intermixed therewith as solution, separating the solids and liquids of the leaching operation, returning the liquid so separated to the flotation stage as the saturated brine of the pulp, and removing excess saturated brine from the circuit as a final product of the treatment.

THOMAS P. CAMPBELL.
WILLIAM B. JACOBSEN.